United States Patent
Chen

[11] Patent Number: 6,104,518
[45] Date of Patent: Aug. 15, 2000

[54] SCANNER PROVIDED WITH ACCURATELY PARALLEL OPTICAL MODULE AND TOP COVER

[75] Inventor: Chih-Ming Chen, Yung-Ho, Taiwan

[73] Assignee: Acer Peripherals, Inc., Taoyuan, Taiwan

[21] Appl. No.: 09/432,829

[22] Filed: Nov. 2, 1999

[30] Foreign Application Priority Data

Dec. 10, 1998 [TW] Taiwan ................................ 87220589

[51] Int. Cl.⁷ .................................................. G02B 26/08
[52] U.S. Cl. .......................................... 359/196; 359/896
[58] Field of Search .................................... 359/196, 197, 359/209, 210, 896; 355/133; 358/474, 494, 497, 483; 399/211, 380

[56] References Cited

U.S. PATENT DOCUMENTS 5,973,815  10/1999  Schissler et al. ...................... 359/212

Primary Examiner—James Phan
Attorney, Agent, or Firm—Ladas & Parry

[57] ABSTRACT

A scanner includes a bottom cover, a top cover, at least one elastic member, at least one rod, an optical module and at least one spacer. The elastic member is disposed on the bottom cover. The rod is supported by the elastic member. The optical module is movably supported by the rod. The spacer is disposed between the top cover and the rod so that the optical module moves parallel to the top cover.

4 Claims, 8 Drawing Sheets

SCANNER PROVIDED WITH ACCURATELY PARALLEL OPTICAL MODULE AND TOP COVER

BACKGROUND OF THE INVENTION

1. Field of the Invention

The present invention relates in general to a scanner having a top cover and an optical module that maintain the same distance from each other during the scanning process.

2. Description of the Related Art

A scanner is an example of the application of lenses to form images. FIG. 1 illustrates the imaging principle of a scanner, in which reference notation "A" represents a surface of a document, "11" represents a lens and "A'" represents a surface of an optical sensor on which an image of the document is formed. How the two surfaces A and A' are parallel to each other (i.e., the parallelism of the surface A with respect to the surface A') greatly influences the resultant image quality. Particularly, a high-resolution scanner requires the precise parallelism of the surface A with respect to the surface A', wherein deviation of the parallelism is restricted less than 1 mm or the uniformity of the image will be poor.

In practical application, the surface A of a scanner system can alternatively indicate a glass surface of a top cover of a scanner on which the document is disposed. A' is the surface of a charge coupled device (CCD). Between the two surfaces A and A' are lenses. In some situations, for example, in order to shorten the light path, additional reflective mirrors are provided in proper positions between the two surfaces A and A'. Furthermore, the lenses and the charge-coupled device are generally built together in a module. Hereinafter, such a module including the lenses and charge coupled device is named the "Optical Module". The surface of the glass of the top cover and the surface of the optical module must be accurately parallel to each other so as to obtain a good image quality. So far, at least three kinds of scanners provide solutions regarding this issue:

(1) FIGS. 2A–2C depict the first kind of conventional scanner, in which an optical module 21 is mounted in a bottom cover 24 via a rod 22 and a wheel 23 (FIGS. 2A and 2B). Then, the bottom cover 24 are assembled together with a top cover 27 of the scanner with two spacers 25', 26' provided therebetween (FIG. 2C). In this case, both the top cover 27 and the optical module are supposed to be parallel to the bottom cover 24.

(2) FIGS. 3A–3C depict the second kind of conventional scanner, in which two iron pieces 32, 33 of the same height are fixed on a bottom cover 31 (FIG. 3A). An optical module 34 is mounted therein (FIG. 3B), wherein one end of the optical module 34 is put around a shaft 33' of the iron piece 33, and the other end of the optical module 34 rests on the iron piece 32. The bottom cover 31 is assembled together with a top cover 35 of the scanner, with the top cover 35 supported by the iron pieces 32, 33 (FIG. 3C). In this case, the two iron pieces 32, 33 are of the same height so that the top cover 35 is parallel to the optical module 34.

(3) FIGS. 4A–4B depict the third kind of conventional scanner, in which an optical module 42 is mounted in a bottom cover 41 from which supporting posts 45, 46 of the same height extend (FIG. 4A). The bottom cover 41 is assembled together with a top cover 43 of the scanner (FIG. 4B), with the glass 44 of the top cover 43 supported by the supporting posts 45, 46. In this case, the two supporting posts 45, 46 are of the same height so that the glass 44 of the top cover 43 is parallel to the optical module 42.

In the first and third cases, the optical modules and top covers are mounted on the bottom covers, which are generally injection molding pieces produced by the injection molding method. However, controlling the deformations of injection molding pieces during the production process is not easy. That is, controlling the tolerances of injection molding pieces is difficult. Therefore, using the bottom covers function as the bases of the optical module and the top cover in order to obtain parallelism of the optical module with respect to the top cover easily fails. Furthermore, the optical module is supported by a wheel. In practice, wheels cannot be exactly round. An optical module supported by a wheel shakes slightly when the wheel is rotated during the scanning process.

In the above-mentioned second case, the parallelism of the optical module with respect to the top cover is mainly determined by the bent angles of the iron pieces. Therefore, shaping the iron pieces by bending (i.e. using the so-called "Sheet-Metal Forming Method") must be accurately controlled. However, using the Sheet-Metal Forming Method will lead the iron pieces into springback. Accurately compensating the springback is very difficult. Besides, a scanner provided with iron pieces is heavy and expensive.

SUMMARY OF THE INVENTION

The object of the present invention is to provide a scanner that solves the above-mentioned problem.

In accordance with the object of the present invention, a scanner is provided. The scanner includes a bottom cover, a top cover, at least one spring, at least one rod, an optical module and at least one spacer. The spring is disposed on the bottom cover. The rod is supported by the spring. The optical module is movably supported by the rod. The spacer is disposed between the top cover and the rod so that the optical module moves parallel to the top cover during the scanning process.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
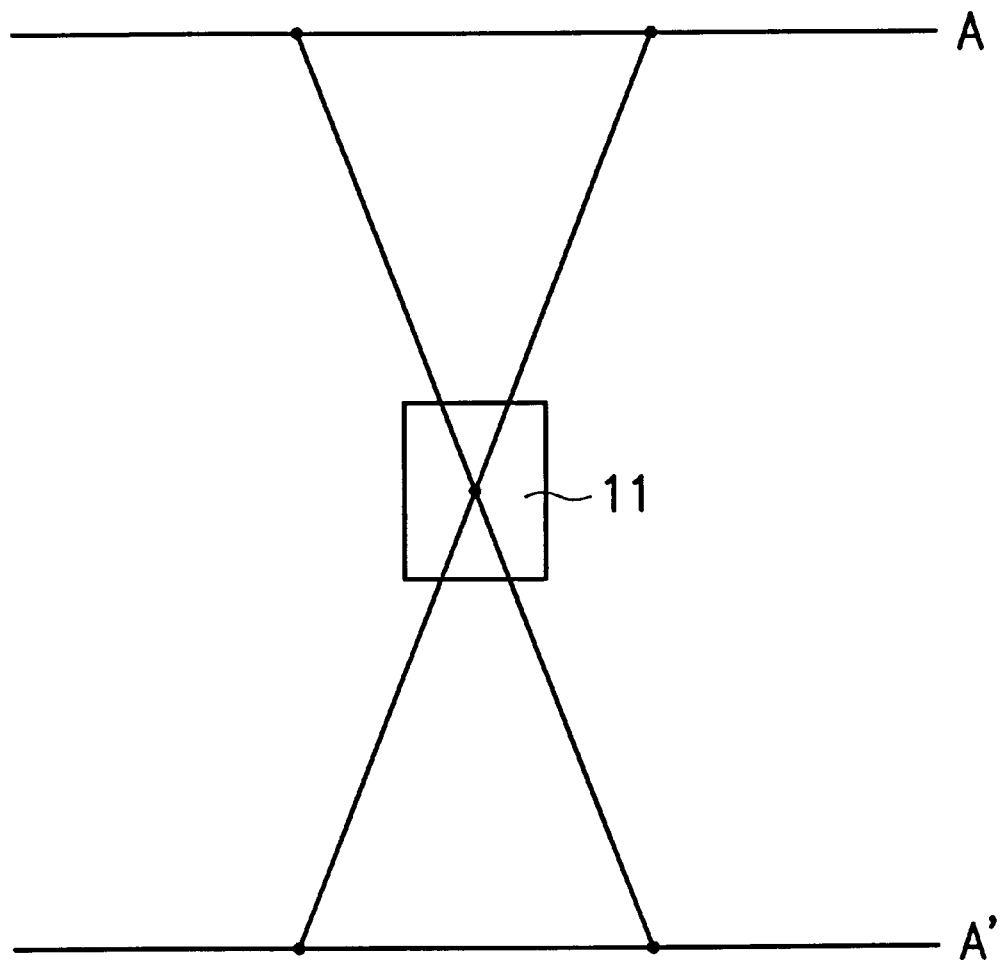
FIG. 1 depicts the image-forming principle of a scanner.
Figure 2A:
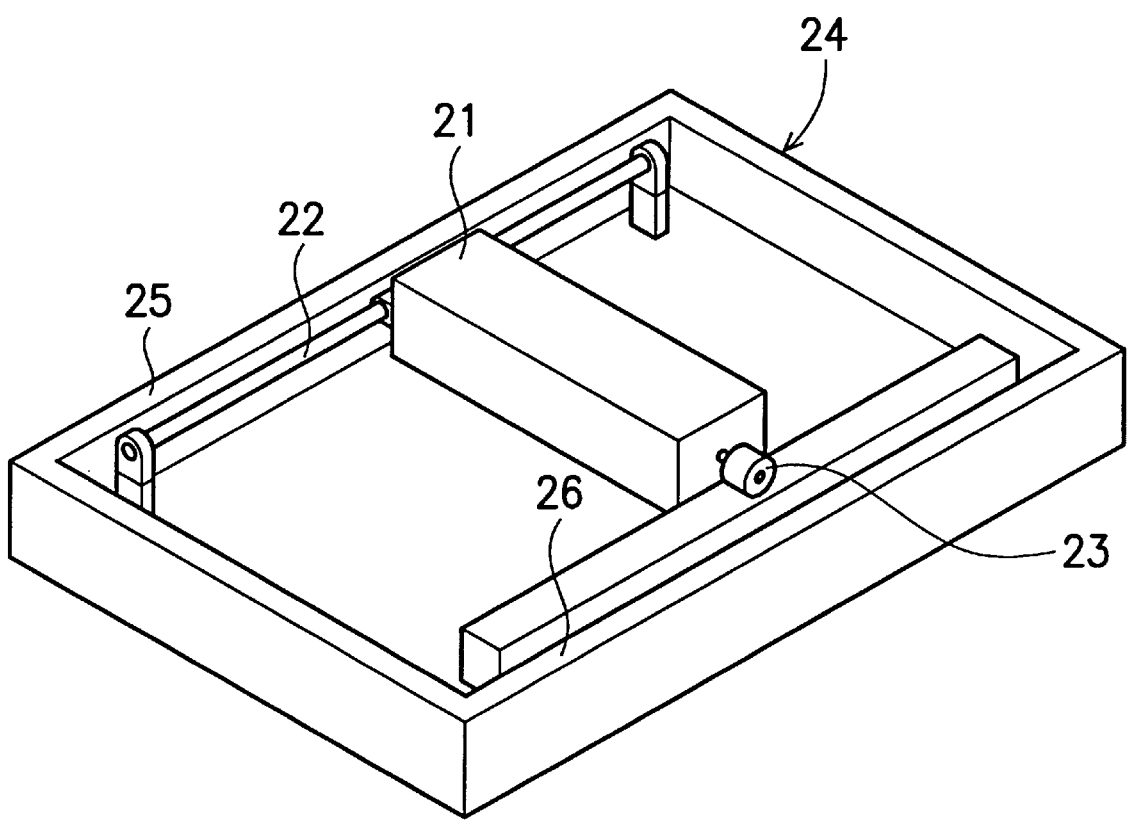
FIGS. 2A–2C depict the steps of assembling a first kind of conventional scanner.
Figure 2B:
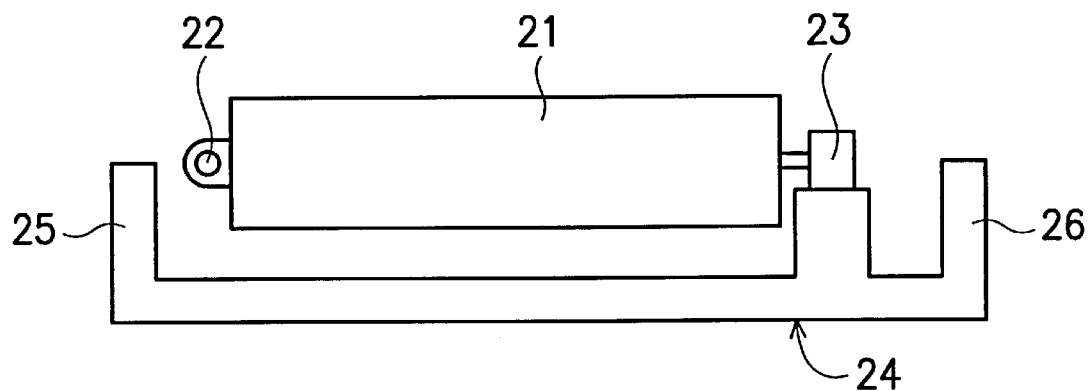
Figure 2C:
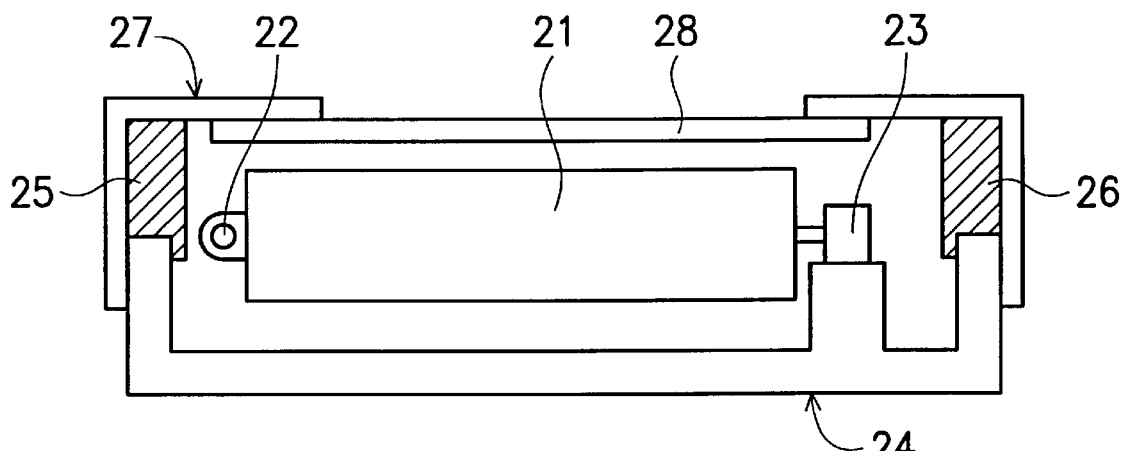
Figure 3A:
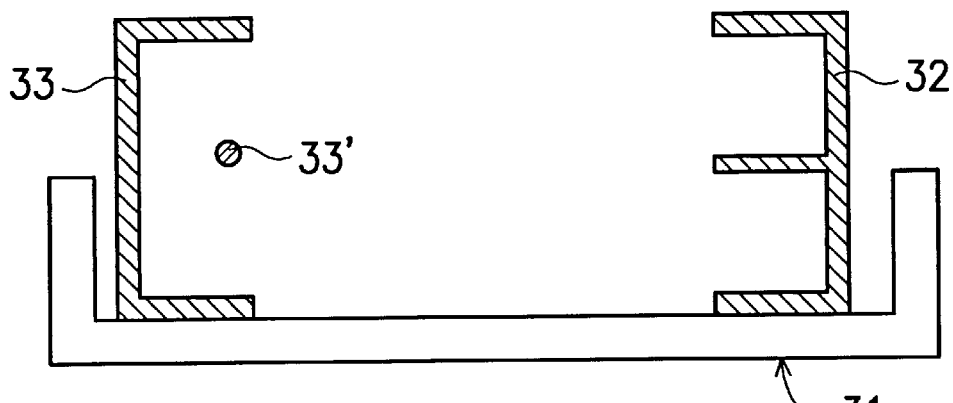
FIGS. 3A–3C depict the steps of assembling a second kind of conventional scanner.
Figure 3B:
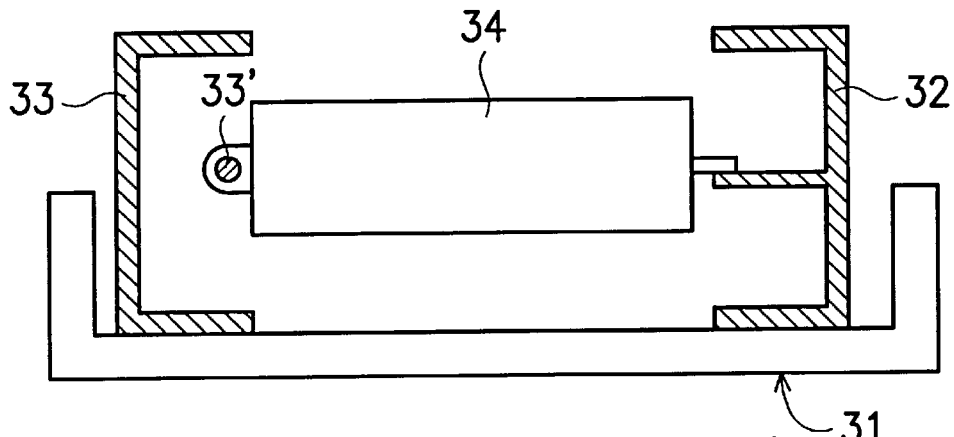
Figure 3C:
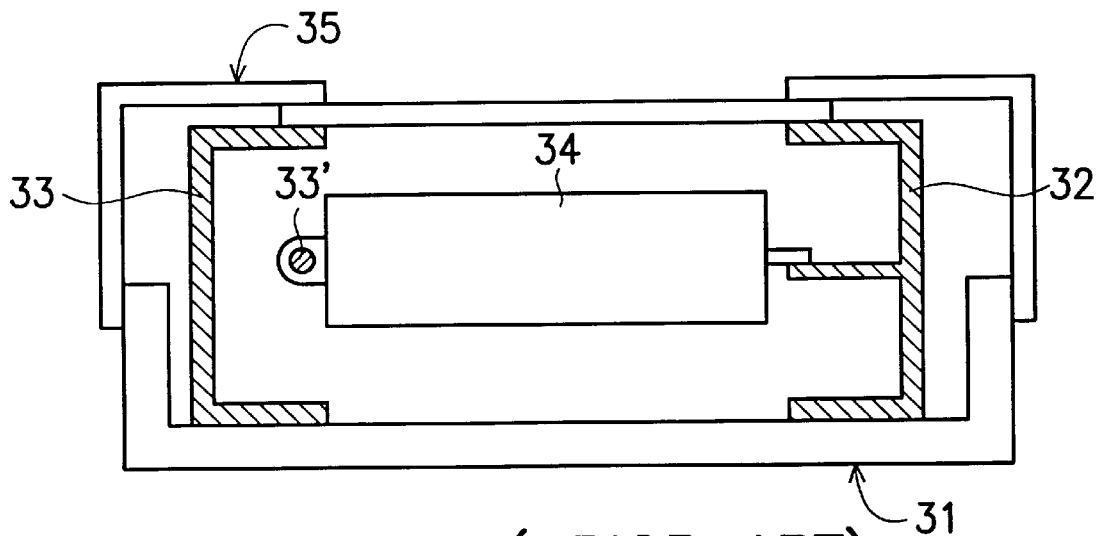
Figure 4A:
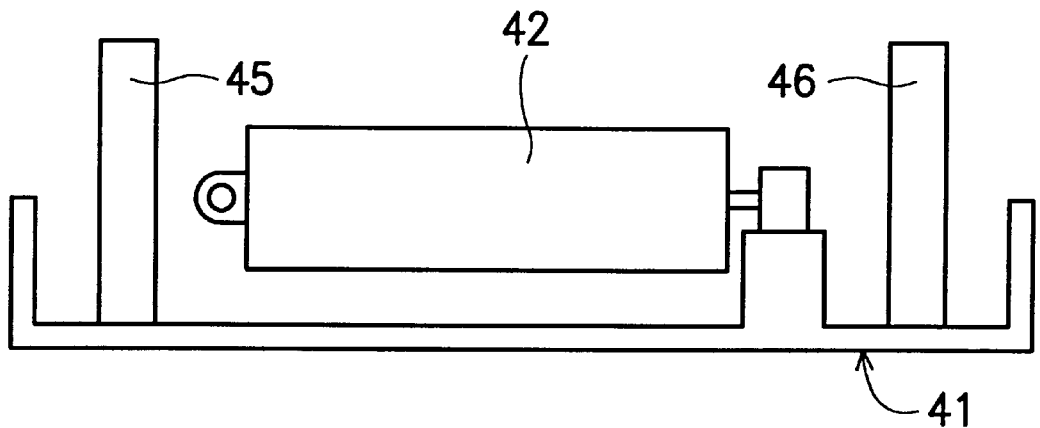
FIGS. 4A–4B depict the steps of assembling a third kind of conventional scanner.
Figure 4B:
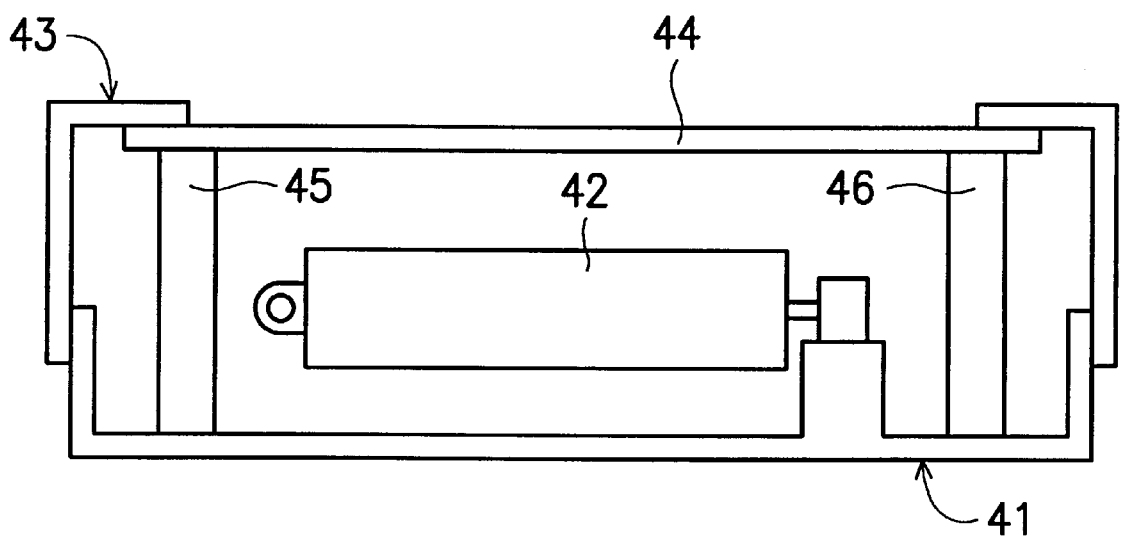
Figure 5A:
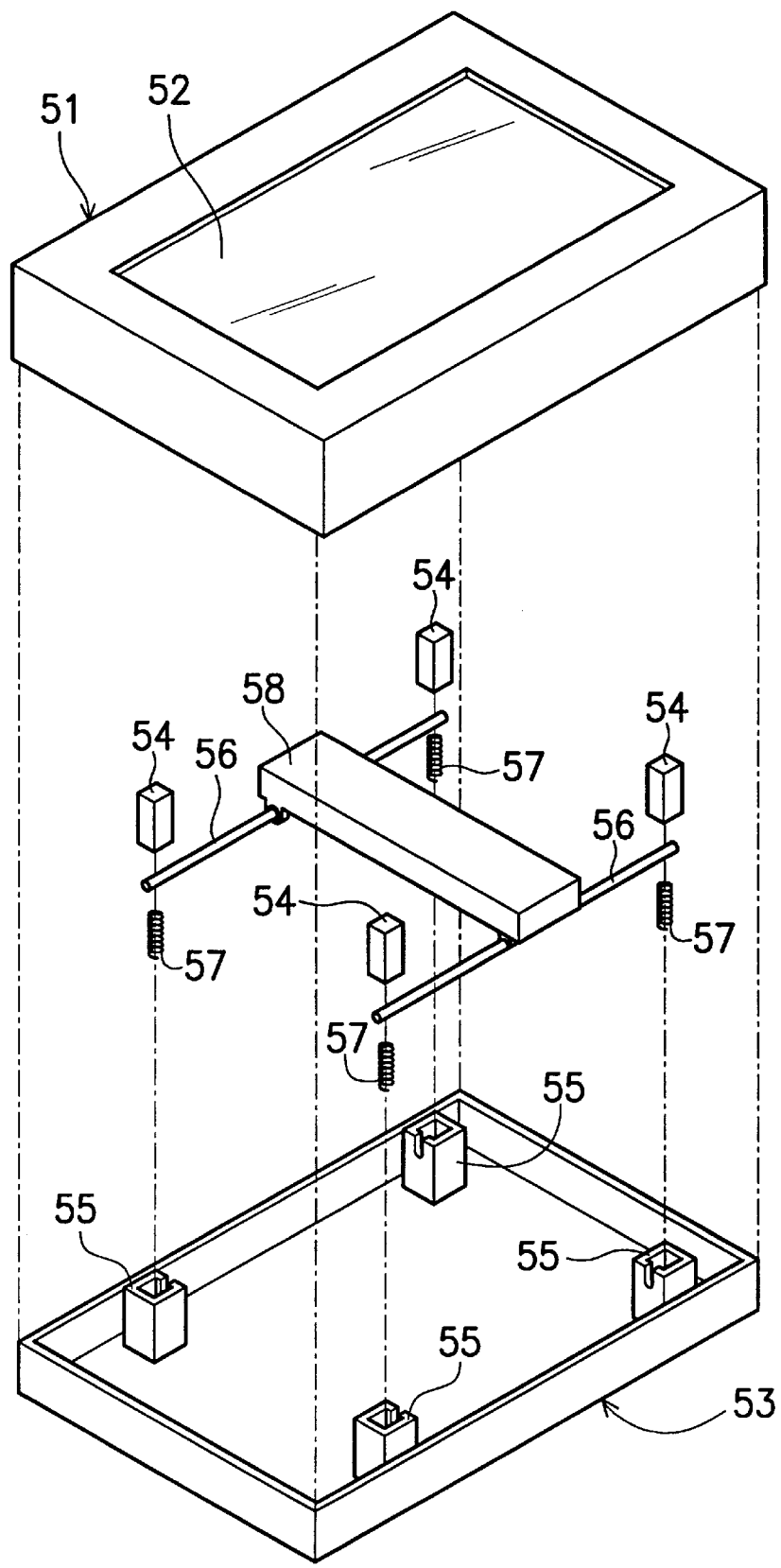
FIG. 5A is an exploded perspective diagram of a scanner according to the present invention.
Figure 5B:
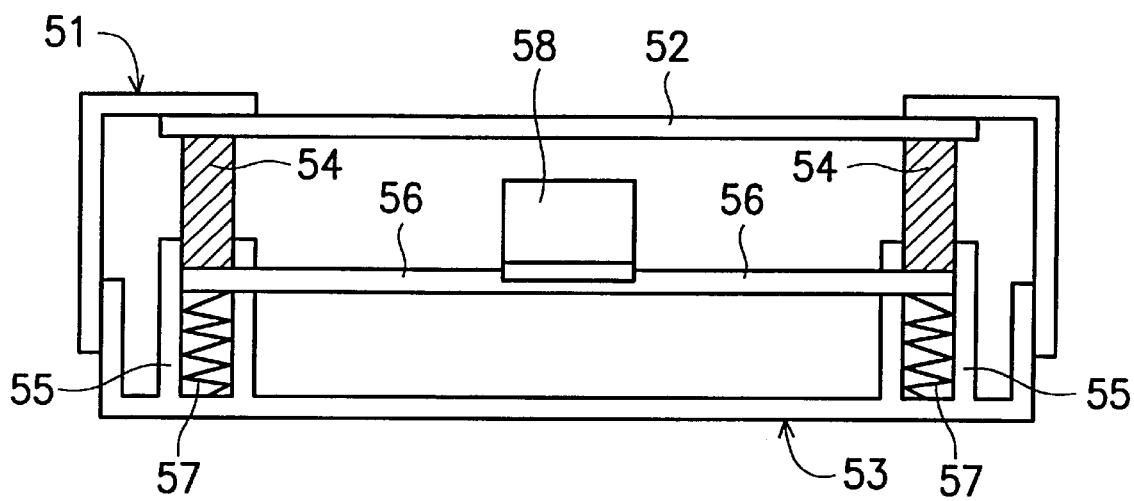
FIG. 5B is a side view of an assembled scanner of the present invention.
Figure 5C:
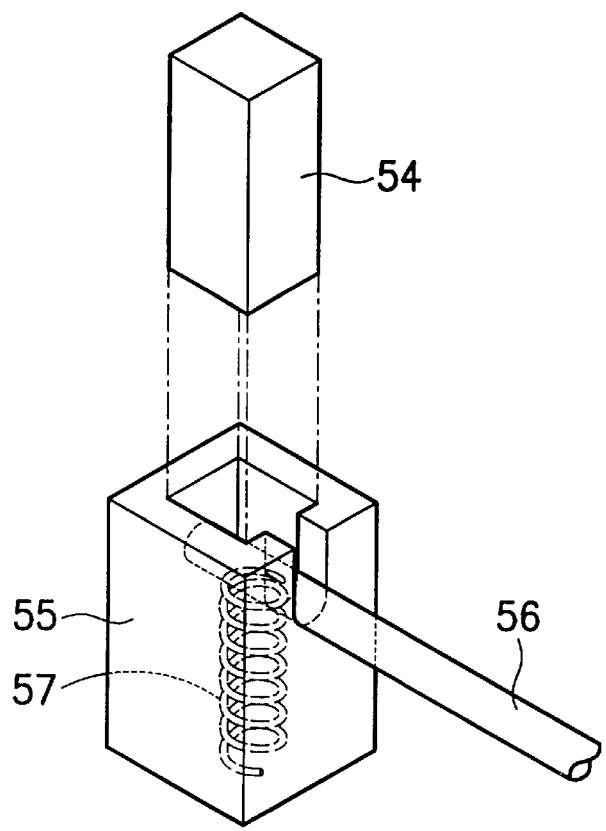
FIG. 5C is a local view of the scanner of the present invention.

Referring to FIGS. 5A–5C, a scanner in accordance with the present invention has a top cover 51 and a bottom cover 53. The mounts 55 are formed close to each corner of the bottom cover 53 respectively. The glass 52 of the top cover 51 is supported by the bottom cover 53 via four spacers 54 of same predetermined height, two rods 56 disposed beneath the spacers 54 for supporting the optical module 58, and four springs 57 (elastic member) pressed by the rods 56 disposed in the mounts 55. While scanning a document disposed on a glass 52 of the top cover 51, the optical module 58 moves on the rods 56 along the longitudinal direction of the top cover 51. As shown in FIGS. 5B~5C, the rod 56 is in the size dimensioned to be slidably received in the corresponding mount 55, and the spacer 54 is in the size dimensioned to be slidably and firmly received in the corresponding mount 55. Both the rods 56 and spacers 54 are allowed to perform up-down sliding movement in the mounts 55.

Because the rods 56 are pushed by the springs 57 to firmly press the spacers 54, the distance between the glass 52 and the rods 56 are accurately defined by the height of the four spacers 54. It is therefore understood that the distance between the glass 52 of the top cover 51 and the optical module 58 supported by the rods 56 entirely depends on the height of the spacers 54. The four spacers 54 in the present invention are of the same height. Thus, the optical module 58 is always kept the same distance away from the glass 52 while moving along the rods 56 during the scanning process. This is true even if the inner surface of the bottom cover 53, by which the top cover 51 and the optical module 58 are disposed upon, is uneven. An advantage of the present invention is that the distance between the glass 52 and the optical module 58 entirely depends on the height of the spacers 54 which can be accurately controlled by using simple and economic production processes. For example, a metal rod is produced by the extrusion process; then, the metal rod is vertically cut into several spacers of the same predetermined height. (1) The mechanical tolerance arose in manufacturing the bottom cover 53 and the top cover 51, or (2) the assembly error arose in coupling the top cover 51 onto the bottom cover 53 both will not change the distance between the glass 52 and the optical module 58.

Furthermore, the rods 56 for supporting the optical module 58 are made of metal. Another advantage of the present invention is that the rigidity and flatness of the metal rod structure is superior to the wheel structure used in the prior art. In the present invention, therefore, the optical module 58 supported by the rods 56 can move more smoothly.

The mechanical tolerance problem arose in manufacturing the mounts 55 can also be reduced by the present invention. If the length of the rod 56 and the longitudinal distance between one pair of mounts 55 do not exactly match, then putting the rod 56 onto the pair of mounts 55 will induce some assembly problems. For instance, if the rod 56 is longer than the distance between the pair of mounts 55, then the longer rod 56 can not be horizontally received by the pair of mounts 55. On the other hand, if the rod 56 is shorter than the distance between the pair of mounts 55, then the shorter rod 56 may vibrate or slide in the longitudinal direction when the optical module 58 moves thereon.

Figure 6A:
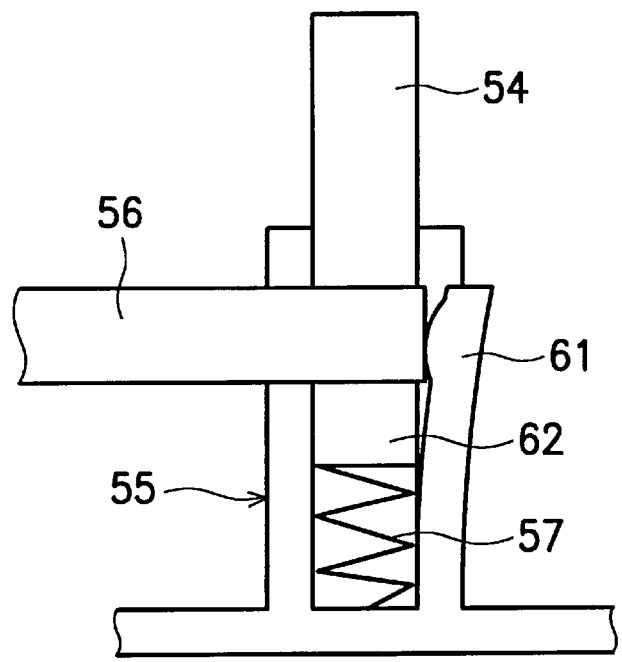
FIG. 6A is a local plan view of a modified scanner according to the present invention.
Figure 6B:
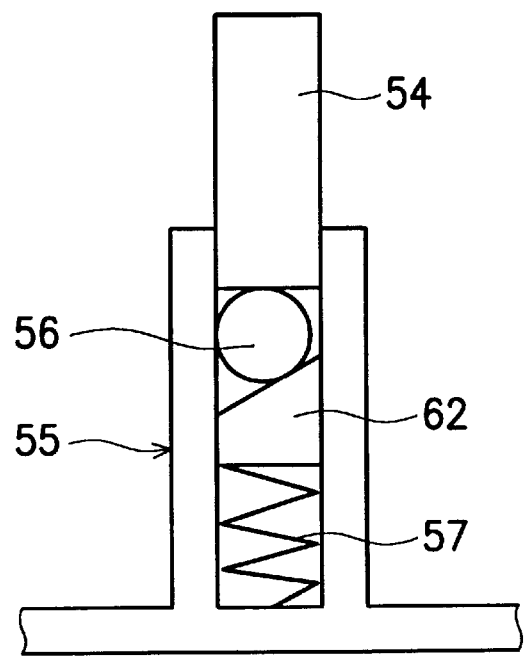
FIG. 6B is a left side view of FIG. 6A.

Therefore, a preferred embodiment of the present invention is provided to solve the problem of mechanical tolerance arose 5 in manufacturing the mounts 55. Please refer to FIGS. 6A and 6B, wherein FIG. 6B is a left side view of FIG. 6A. The length of the rod 56 is slightly greater than the longitudinal distance between the pair of mounts 55. Furthermore, a cantilever resilient piece 61 is formed on the wall of the mount 55. When the rod 56 is received in the mounts 55, one end of the rod 56 pushes against the cantilever resilient piece 61. The cantilever resilient piece 61 is bent to compensate the redundant length of the rod 56. Also, the rod 56 is clamped firmly by the cantilever resilient piece 61 so that the rod 56 does not vibrate or slide in the longitudinal direction when the optical module 58 moves thereon.

It is noted that the spring 57 pushes the end portion of the rod 56 toward the spacer 54 so that the spacer 54 always keeps close contact with both the glass 52 and the rod 56. That is, the rod 56 should be firmly received by the mounts 55 to make the elevation of the rod 56 accurately adjusted. However, due to the mechanical tolerance problem arose in manufacturing the mounts 55, there may be some lateral gap left between the inner surface of the mount 55 and the rod 56; therefore, the rod 56 is not firmly received by the mount 55. In the preferred embodiment of the present invention, a wedge member 62 is disposed between the rod 56 and the spring 57, as shown in FIG. 6B, to press the rod 56 against the inner surface of the mount. Then, the receiving arrangement of the rod 56 is stable.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An improved scanner including a top cover, a bottom cover, a glass disposed on said top cover, and an optical module for receiving image of a document placed on the glass, wherein the improvement comprises:

a mount formed on the bottom cover;

an elastic member disposed in the mount;

a rod dimensioned to be slidably received in the mount and upwardly supported by the elastic member;

a spacer dimensioned to be slidably received in the mount and upwardly pressed by the rod against the glass, wherein the rod and spacer are allowed to perform up-down sliding movement in the mount, and the distance between the glass and the rod is defined by a predetermined height of the spacer.

2. A scanner as claimed in claim 1, wherein said mount further comprising a cantilever resilient piece for clamping against one end of the rod so that the rod does not vibrate or slide when the optical module moving thereon.

3. A scanner as claimed in claim 1, wherein said scanner further comprising a wedge member disposed between the rod and the elastic member for pressing the rod against an inner surface of the mount.

4. A scanner including a top cover, a bottom cover, a glass disposed on said top cover, and an optical module for receiving image of a document placed on the glass, comprising:

two mounts formed on the bottom cover;

two elastic members disposed in the mounts respectively;

a rod dimensioned to be slidably received in the mounts and upwardly supported by the elastic members;

two spacers dimensioned to be slidably received in the corresponding mount and upwardly pressed by the rod against the glass, wherein the rod and spacers are allowed to perform up-down sliding movement in the mounts, and the distance between the glass and the rod is defined by a predetermined height of the spacers.

* * * * *